US005119295A

United States Patent [19]

Kapur

[11] Patent Number: 5,119,295

[45] Date of Patent: Jun. 2, 1992

[54] CENTRALIZED LOTTERY SYSTEM FOR REMOTE MONITORING OR OPERATIONS AND STATUS DATA FROM LOTTERY TERMINALS INCLUDING DETECTION OF MALFUNCTION AND COUNTERFEIT UNITS

[75] Inventor: Shashi B. Kapur, Tampa, Fla.

[73] Assignee: Telecredit, Inc., Los Angeles, Calif.

[21] Appl. No.: 661,723

[22] Filed: Feb. 27, 1991

Related U.S. Application Data

[63] Continuation-in-part of Ser. No. 469,981, Jan. 25, 1990.

[51] Int. Cl.[5] .......... G06F 15/28

[52] U.S. Cl. .......... 364/412; 379/106

[58] Field of Search .......... 364/472, 479; 379/79, 379/88, 245, 104-107; 273/138 A

[56] References Cited

U.S. PATENT DOCUMENTS

| | | | |
|---|---|---|---|
| 4,494,197 | 1/1985 | Troy et al. | 364/412 |
| 4,833,307 | 5/1989 | Gonzalez-Justiz | 235/381 |
| 4,842,278 | 6/1989 | Markowicz | 364/412 |
| 4,879,716 | 11/1989 | McNally et al. | 304/412 |
| 4,882,473 | 11/1989 | Bergron et al. | 238/580 |
| 4,922,522 | 5/1990 | Scalon | 364/412 |

*Primary Examiner*—Gail O. Hayes
*Attorney, Agent, or Firm*—Nilsson, Robbins, Dalgarn, Berliner, Carson & Wurst

[57] ABSTRACT

Remotely located lottery terminals, for operation by purchasers of lottery tickets, are adapted to be coupled by telephone to each other and to a central host computer as for verification of tickets by storing backup lottery data. Individual terminals are self-sufficient to approve ticket sales, issue tickets, encrypt data, register data and verify winners. Tickets are sold by terminals on the basis of various payment forms, e.g. cash, credit cards and payslips. One aspect of security in the relationship between the host computer and the remote terminals is provided by monitoring for operating anomalies, as a disconnected terminal, format irregularities or identification failures. Detection of an anomaly prompts corrective action, e.g. commanding a fresh call, realigning data or calling numbers for identification confirmation, as by use of ANI calling number identification.

16 Claims, 4 Drawing Sheets

CENTRALIZED LOTTERY SYSTEM FOR REMOTE MONITORING OR OPERATIONS AND STATUS DATA FROM LOTTERY TERMINALS INCLUDING DETECTION OF MALFUNCTION AND COUNTERFEIT UNITS

RELATED SUBJECT MATTER

This is a continuation-in-part of application Ser. No. 07/469,981 filed Jan. 25, 1990 and entitled "Telephonic Lottery Processing System Issuing Tickets".

BACKGROUND AND SUMMARY OF THE INVENTION

The public lottery has become widely accepted as a basis for supporting government activities while providing aspects of entertainment and hope. Conventional public lotteries have been facilitated by computers and data processing systems. One conventional lottery system involves ticket dispensing terminals coupled by leased telephone lines to a central computer. The terminals are placed in retail establishments for operation by clerks to issue lottery tickets based either on a random number or a number selected by a purchaser. Such systems require concurrent operation of the terminal, the communication facility and the central computer. As a result, technical difficulties are common. Other problems attendant the operation of concurrent lottery systems include security breaches, high costs for leased telephone lines, poor response time during peak loads and inflexbility to accommodate modifications.

The lottery industry appears to thrive on innovation. Seemingly, it needs new games, new ideas, new choices and new technology to sustain its success and continue to meet its responsibility effectively to deliver revenues, as to individual states. Specifically, effective innovation may take the form of a secure system to sell tickets that are traditionally delivered in association with interactive on-line systems, utilizing improved terminal and central technology. Accordingly, a need exists for an on-line system that is effective and efficient as well as secure.

Implementing a practical computerized lottery system in accordance with the recognized desirable aspects raises certain specific needs. Generally, a need exists for a secure, accurate, reliable and flexible apparatus to accept and approve payment directly from a purchaser of lottery tickets. Also, a need exists for apparatus to issue receipts or lottery tickets that are capable of accurate and reliable authentication. Furthermore, a need exists for an apparatus to effectively record data associated with the sale of lottery tickets so as to reliably identify and verify winners.

Systems incorporating remote terminals with a central or host computer through a telephonic link are susceptible to various forms of security breach. For example, terminals may be subject to improper on-site tampering, as by persons approved for limited access to the units. Also, stolen terminals may be removed to another location for illicit operation. Other security breaches may involve computer hackers seeking to violate the system without a terminal.

In general, the present invention comprises a lottery processing system for operation with telephonic communication facilities, that is, a public dial-up network. The lottery processing system utilizes receipts or ticket documents to evidence lottery participation. A host computer supports the independent operation of plural remote terminals. In that relationship, operating anomalies prompt action by the host computer appropriate to the anomaly. For example, a remote terminal may be instructed to place a fresh call, thereby providing calling-number identification signals (ANI) for comparison with a reference. Other actions may involve isolation of a terminal or disqualification by clearing operating data.

In the disclosed system, the terminals may be operated by purchasers to dispense lottery tickets in return for various forms of payment, e.g. cash, credit card and so on. Controls are incorporated in the terminal for regulating the use of a credit card.

The lottery terminals dispense tickets incorporating an anticounterfeit characteristic for positive verification and identification. Periodically, the terminals communicate with other terminals and the host computer to accomplish backup records for reliability and security. Ticket documents presented as winners may be verified at the issuing terminal. Accordingly, a secure, economical lottery processing system is provided capable of accepting payment for tickets with certain controls, issuing verifiable tickets and maintaining record data for authenticating winning tickets.

BRIEF DESCRIPTION OF THE DRAWINGS

In the drawings, which constitute a part of this specification, exemplary embodiments exhibiting various objectives and features hereof are set forth. Specifically.

DESCRIPTION OF THE ILLUSTRATIVE EMBODIMENT

As required, a detailed illustrative embodiment of the present invention is disclosed herein. However, physical communication systems, data formats, verification methods and operating structures in accordance with the present invention may be embodied in a wide variety of different forms, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figures 1, 2:
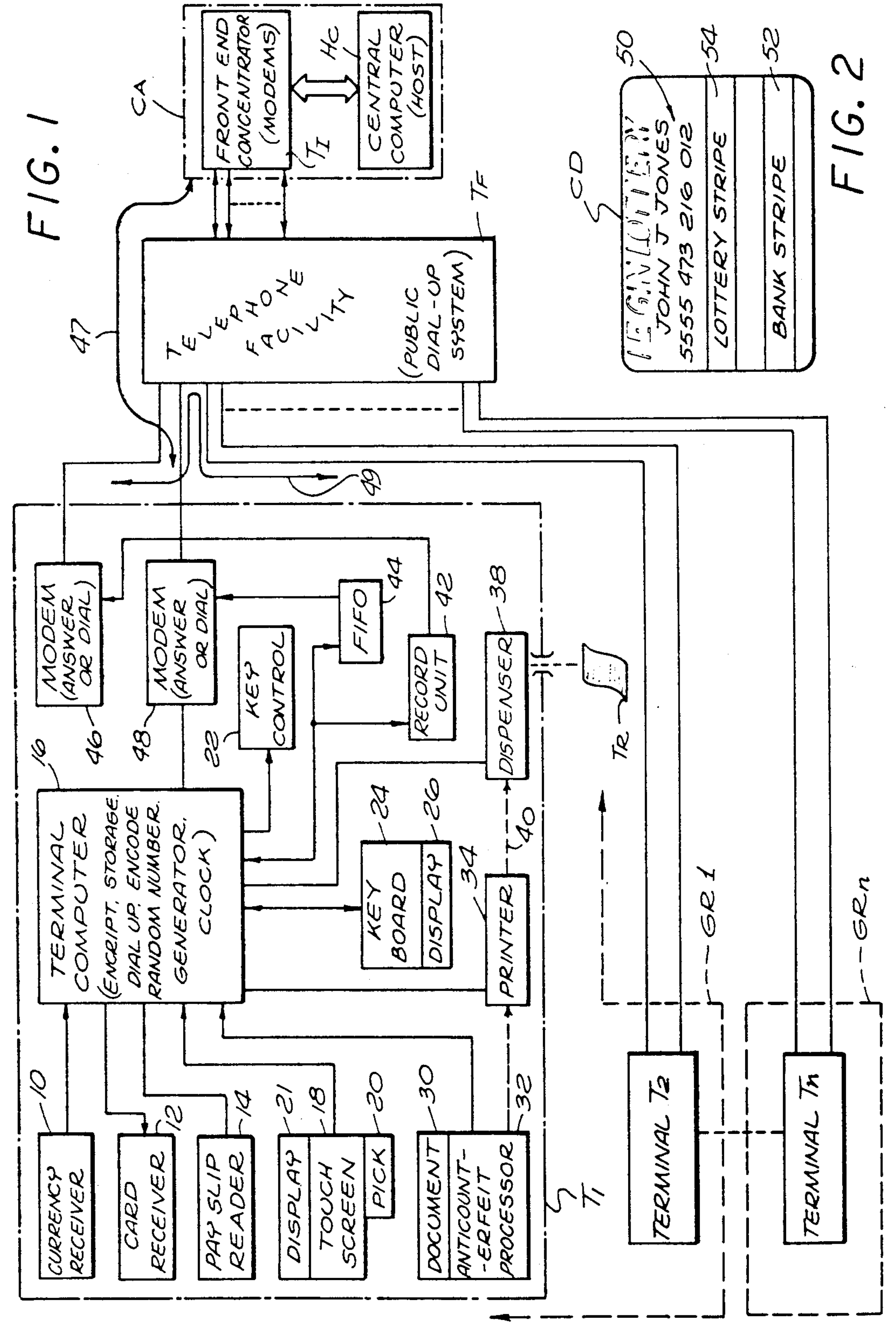
FIG. 1 is a block diagram of a system constructed in accordance with the present invention.
FIG. 2 is a plan view of a card for use in the system of FIG. 1.

Referring initially to FIG. 1, a series of remote terminals T1 through Tn are represented (left). The terminals are generally similar and, accordingly, only the terminal T1 is illustrated in detail. In the disclosed embodiment, the remote terminals T1 through Tn comprise substantially independent lottery ticket processing structures, are interconnected for backup communication through a telephone facility TF and also are connected through the telephone facility TF to a central station apparatus CA incorporating telephonic interface apparatus TI and a host computer HC.

The individual terminals T1–Tn are provided in groups, specifically groups GRl–GRn. For example, group GRI may include terminals T1-T20. Similarly, lo the group GRn may include a similar number of individual terminals. Terminals within a group may be assigned a similar calling number and also may involve supporting intercommunication.

Considering the operation of the system of FIG. 1 somewhat preliminarily, the terminals T1-Tn might be variously located as in retail establishments where they are susceptible to observation yet are accessible to lottery ticket purchasers. A person contemplating the purchase of a lottery ticket has different alternatives for payment. Specifically, the purchaser may either: deposit currency, use a credit card or use a payslip in accordance with conventional practice.

Upon acceptance of the payment form by a terminal, certain screening tests may be performed to approve the sale. Thereafter, the purchaser enters his choice for the lottery ticket. For example, in one format the purchaser indicates a sequence of six numbers of his choice, i.e. numbers of one or two digits. Alternatively, the purchaser may simply instruct the terminal T1 to randomly generate a number sequence. In either event, the selected number sequence is recorded and a lottery document or ticket is accordingly processed and issued.

Essentially, considering the terminal T1, a lottery receipt or ticket TR is issued as illustrated to evidence the purchaser's participation in the lottery. The ticket TR may be imprinted or otherwise recorded with pertinent data including the lottery number, the date of purchase and so on. An anti-counterfeit device or feature also is provided on the ticket TR.

The lottery data is stored within the terminal T1 and also communicated for backup storage to another terminal, e.g. the terminal T2, through the telephone facility TF. Furthermore, the lottery data is communicated through the telephone facility TF to the central apparatus CA for further backup. In that regard, transmission intervals may vary with different installations; however, for security purposes, the lottery data generally is encrypted or coded.

Summarizing to some extent, each of the terminals T1 through Tn is capable of independently qualifying sales transactions and issuing lottery tickets TR to reliably evidence participation in the lottery with specific data. Furthermore, the terminals T1 through Tn independently accumulate the lottery data associated with the issuance of lottery tickets TR. Backup lottery data is held reciprocally in other terminals and concentrated in the central computer HC.

In one embodiment of FIG. 1, at predetermined intervals, the central computer HC actuates the concentrator TI to dial up each terminal through the telephone facility TF. Thus, accumulated lottery data from the terminals is received and stored in the central computer HC. Alternatively, the central computer HC may cue terminals T1-Tn to dial up, or such dial-up operations may be scheduled or commanded within a terminal if an excess volume of data is accumulated. Somewhat similarly, the terminals T1 through Tn may maintain backup data in other terminals as a result of dial-up operations through the telephone facility TF. Verification of winning tickets usually will be initiated by a call to the central computer HC from a remote terminal, e.g. terminal T1.

In view of the above description of the system of FIG. 1, component structures of the system will now be treated in further detail. Again, the terminals T1 through Tn being structurally similar, only the terminal T1 is shown and described in detail.

As indicated above, payment for a lottery ticket at the terminal T1 may be made in the form of currency (a bill), a card (credit, debit, etc.) or a payslip (purchased document). Accordingly, the terminal T1 includes a currency receiver 10, a card reader 12 and a payslip reader 14. Various forms of currency receivers are well known in the prior art, and in that regard the currency receiver 10 may simply comprise a unit for receiving and verifying bills, the acceptance of which prompts an electrical signal from the receiver 10 to a terminal computer 16.

The card reader 12 may take the form of a magnetic card reader for sensing data from magnetic stripes as to indicate a purchaser's bank account or debit account along with further identification and indications of use. In the disclosed embodiment, the card reader 12 senses two magnetic stripes, one of which is a traditional bank card stripe while the other constitutes a lottery stripe and regulates the use of the card. The structure and format of the card is considered below in greater detail with reference to FIG. 2. In any event, the card reader 12 provides transaction data to the terminal computer 16.

The payslip reader 14 may comprise various forms of document verification units as well known in the prior art for verifying a payslip and providing a resulting signal to the terminal computer 16.

In addition to paying for a lottery ticket, as indicated above, the purchaser is afforded an opportunity either to: select a lottery number sequence or instruct the system to select a random number sequence. Accordingly, a touch screen 18 is provided in the terminal T1 which includes a "pick" tab 20 for specifying computer random selection of a lottery number.

The touch screen 18 may take the form of well known simulated keypads enabling the purchaser to input control data and select a lottery number. For example, the purchaser might simply touch designated areas of the screen to designate a lottery number: "15-40-6-47-25-22". Note that the touch screen 18 also incorporates a display 21 in accordance with well known techniques enabling the purchaser to confirm the lottery number selected. With the designation of a selected lottery number, the touch screen 18 supplies representative digital data to the terminal computer 16.

As indicated above, the purchaser may command the terminal computer 16 to randomly select a number sequence. To accomplish such an operation, the purchaser simply touches the "pick" tab 20 prompting the transmission of a signal to the terminal computer 16 to generate a number sequence. Specifically, the terminal computer 16 incorporates a random number generator which generates random number sequences on command.

The terminal computer 16 may take the form of a PC or microcomputer incorporating various control capabilities along with the functional operations of encryption, storage, telephone dial-up, document encoding, random number generation and time clock. The detailed aspects of the operations are represented in an exemplary format illustrated in FIG. 3.

The terminal computer 16 is controlled for operation by a key control 22 which may be mechanical or electronic. Essentially, access to the terminal computer 16 and control of its operation is limited and requires actuation of the key control 22 using a mechanical or electronic key.

Program variations and interface operations within the terminal computer 16 are accomplished through a manual terminal incorporating a keyboard 24 and a display 26. Other variable operations of the terminal computer 16 include the frequency of telephonic transfer of backup data and the detailed control signals for the preparation and delivery of lottery tickets TR.

A supply of raw documents for lottery tickets is held in a document storage section 30 of a document processor 32 for preparing lottery tickets. Specifically, the processor 32 incorporates apparatus for sensing an anticounterfeit characteristic of each document that will uniquely identify the document if subsequently presented as a winner. In that regard, the processor 32 may include structure in the form of an anticounterfeit processor as disclosed in U.S. Pat. No. 4,423,415. Accordingly, a substantially unique characteristic of the paper in a document is sensed and reduced to representative signals that are supplied to the terminal computer 16 as the document is passed from the processor 32 to a printer 34 as represented by a dashed line 36. Note that the processor 32, the printer 34 and a dispenser 38 are combined in a document handler as represented by dashed lines 36 and 40. Accordingly, tickets move from unit to unit.

The printer 34 is controlled and actuated by the terminal computer 16, and in that regard the following lottery data may be printed:

Lottery number,
Date of ticket purchase,
Anticounterfeit characteristic, and
Location of dispensing terminal.

The printer 34 records the data from the computer 16 on the raw document to accomplish a completed ticket TR, which is supplied to the dispenser 38 as indicated by a dashed line 40. The dispenser 38 may perform various checks on the completed lottery ticket TR before providing it to the purchaser.

Concurrent with the preparation and delivery of a lottery ticket as explained above, the terminal computer 16 processes data that is stored for possible future use to reliably identify and verify lottery winners. In that regard, lottery numbers may be encrypted, as by the use of a "trap door" or other well known codes, so as to increase the difficulty of tampering.

Encrypted lottery numbers may be stored within the terminal computer 16 and also stored in a buffer record unit 42 along with a first-in-first-out register (FIFO) 44. The record unit 42 may take various forms of buffer storage and serves to hold lottery data for periodic transfer through a modem unit 46 to another of the terminals T2 through Tn for backup. The path is indicated by a line 49. The register 44 (FIFO) also serves as a buffer storage in relation to a modem 48 for transfer to the central computer HC. The path is indicated by a line 47. Various forms of buffer storage units and FIFO registers are well known that are capable of functioning as the structures 42 and 44.

The modems 46 and 48 possess both answering and dialing capability in cooperation with the telephone facility TF. Accordingly, the transfer of backup data may be initiated either at the terminal T1 or by the central computer HC. Again, various forms of modems with both "answer" and "dial-up" capability are well known and widely used in the prior art.

In view of the above structural description of the system of FIG. 1, detailed consideration will now be given to a form of lottery card for use in the terminals T1–Tn to create a payment record. That is, as indicated above, the terminals T1–Tn each incorporate a card receiver, e.g. receiver 12, incorporating card processing capability including the capability to sense data from magnetic stripes. In that regard, an exemplary card for use in the card reader 12 is illustrated in FIG. 2 and will now be considered in detail.

The card CD (FIG. 2) may be formulated of plastic in accordance with widespread technology and carries embossed indicia 50 along with a bank-record magnetic stripe 52 and a lottery magnetic stripe 54. The bank-record stripe 52 may have a format similar to credit cards in widespread use and may be processed accordingly. That is, with the purchase of a lottery ticket, the bank stripe 52 is processed in accordance with the conventional processing associated with widely used credit cards. The lottery stripe 54 carries information on the extent to which the card CD has been used and limits for such use. For example, a card holder "John J. Jones", account number "5555 473 216 012", holding a lottery card CD might be limited to the purchase of tickets of an aggregate value of up to twenty-five dollars per month. The limit is recorded on the magstripe 54 in accordance with conventional magnetic encoding along with a record of the lottery credit transactions supported by the card CD for the current month. Of course, the record is cleared at the beginning of each month and in the event that the holder attempts to use the card in excess of the limits, e.g. twenty-five dollars, it will be rejected. Essentially, the limitations are imposed in the interests of controlling participation in a lottery based on credit.

Figure 3:
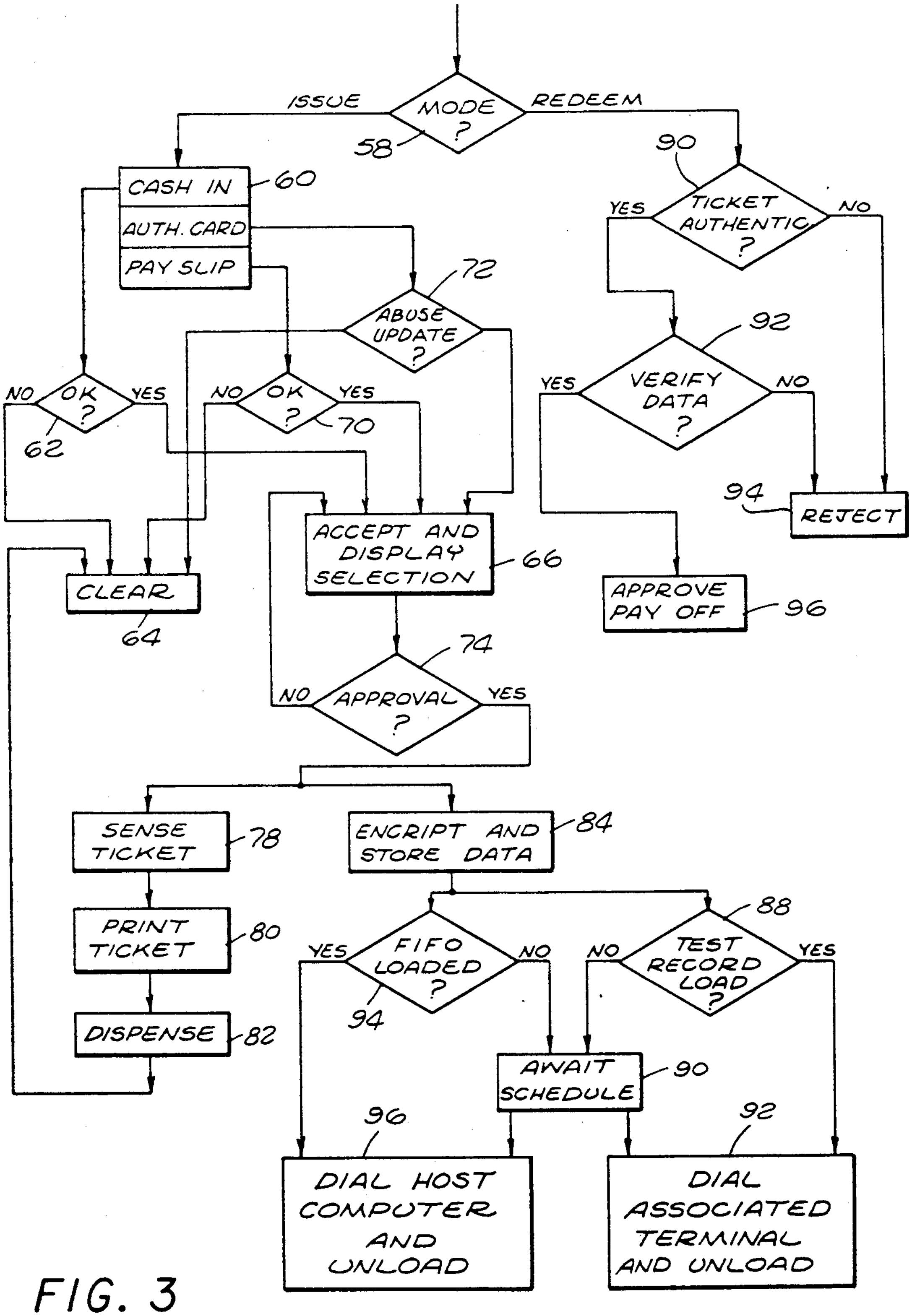
FIG. 3 is a flow diagram of one operating format of the system of FIG. 1.

In view of the above structural descriptions, the operation of the described embodiment of FIG. 1 will now be treated with reference to FIG. 3 assuming various conditions and pursuing the resulting operations particularly as related to control by the terminal computer 16. Initially, assume an operational period of time and with the terminal T1 in a operating mode to issue a lottery ticket TR, the query being indicated by the block 58 at the top of FIG. 3. In the "issue" mode, payment may involve any of three possibilities as indicated above, i.e. "cash in", "authorized card", or "payslip".

Also assume a person at the terminal T1 who has inserted a bill into the cash receiver 10 to initiate the process of issuing a lottery ticket TR. The cash mode is indicated by the block 60 (FIG. 3) and is in accord with the assumed conditions. Essentially, the currency receiver 10 (FIG. 1) tests the authenticity of the inserted bill as indicated by the query block 62 in FIG. 3. If the bill is not valid, it is returned to the purchaser with an indication of unacceptability and the system is cleared as indicated by the block 64. Conversely, approval of the bill results in its acceptance and an indication to the purchaser (on the touch screen 18) to proceed with the transaction. The operation is represented in FIG. 3 by the block 66.

As there are various modes of payment for lottery tickets, there are various paths for attaining the operation illustrated by the block 66 (proceed with selection). Before proceeding with explanations of the operations following the step represented by the block 66, consider alternative-payment operations, i.e. payment by credit card and payslip.

Processing and approval of payslips as a form of payment involves an operation quite similar to the acceptance of a monetary bill. Essentially, with the presentation of a payslip at the reader 14 (FIG. 1) a test operation is performed as represented by the query block 70 (FIG. 3) to determine the acceptability of the payslip. If the payslip is not acceptable, the operation proceeds to the block 64 and the terminal is cleared for a fresh operation. Alternatively, if the payslip is approved, the operation proceeds to the block 66 as illustrated placing the terminal in a condition to prepare and process a lottery ticket TR.

Payment in the form of a credit card involves a somewhat different test pattern. Specifically, moving from the block 60 (FIG. 3) with regard to a credit card, the system performs tests for card abuse, and updates the card as indicated by query block 72. Specifically, the abuse tests may involve the typical tests associated with the use of credit cards plus the test of current lottery usage in relation to imposed limits as described above.

If the tests of block 72 indicate the card is unacceptable, i.e. being abused, the process again proceeds to block 64 clearing the current operation. Otherwise, approval of the card's use prompts the system to update the card and proceed to the block 66, again indicating the terminal to be in a "paid" condition preparatory to issuing a lottery ticket.

At the process step represented by the block 66, the display 21 (associated with the touch screen 18, FIG. 1) instructs the purchaser to enter a selected number sequence. As indicated above, the number may be entered digit-by-digit or by instructing the system to randomly pick an entry number. In either event, the display 21 reveals the selected number for approval by the purchaser.

Concurrent with the selection, the terminal computer 16 tests the selected number sequence for confirmation to a specified format, e.g. six numbers. The test is indicated by the query block 74 (FIG. 3). If the tentative number sequence is not acceptable, the process returns to the step indicated by the block 66 for another selection. Alternatively, if the selected number is approved, the process proceeds to the concurrent operations of registering the lottery data and preparing the lottery ticket. Consider next the preparation of the lottery ticket which involves operation of the processor 32 (FIG. 1), the printer 34 and the dispenser 38.

On instruction from the terminal computer 16, the processor 32 draws a document from the storage section 30 and senses a generally unique physical characteristic of the document to provide representative signals to the terminal computer 16. The operation is illustrated in FIG. 3 by the block 78. Afterward, the document is passed to the printer 34 by the document handler represented by the dashed line 36.

The terminal 16 integrates the characteristic data of the document (anticounterfeit characteristic) with other data including the selected lottery number, the date, the time, the terminal identification and so on as indicated above. Signals representative of the composite data are then supplied to drive the printer 34 (FIG. 1) to record the data as represented by the block 80 (FIG. 3). Consequently, the ticket is printed with vital information and incorporates an anticounterfeit aspect. Next, via the document handler represented by the dashed line 40 (FIG. 1), the ticket passes to the dispenser 38 and dispensed as indicated by the block 82 (FIG. 3). As indicated above, the dispensing step may include checking and verification operations to confirm the prepared lottery ticket TR.

Concurrently with the preparation and dispensing of the lottery ticket TR, the lottery data in the terminal 16 is encrypted for secure registration. The step is indicated in FIG. 3 by the block 84. As indicated above, various encryption techniques may be employed with the objective of immunizing the data from fraudulent tampering.

After encryption, the data is stored internally within the computer 16 (FIG. 1), then supplied to the record unit 42 and the FIFO register 44. Lottery data in the record unit 42 is essentially buffered for subsequent transfer to another one of the terminals T2–Tn. Data in the register 44 is held for transfer on schedule to the central computer HC. These operations are considered in detail below.

Various schedules may be established for transferring data from the buffer record 42 through the modem 46 and telephone facility TF to another terminal. Generally, a single designated terminal will be involved; however, redundancy techniques also may be utilized. The general operation of the transfer is illustrated in FIG. 3 by the query block 88 which may accommodate any of a variety of programs. In that regard, a preliminary waiting schedule may be established as indicated by the block 90 and the unloading operation may also be scheduled as indicated by the block 92.

With regard to the FIFO register 44 (FIG. 1) a threshold of register content is established, the level of which in one embodiment indicates the need to unload. If the threshold is not attained by the contents of the register 44, the terminal awaits the initiation of a transfer by the central computer HC as indicated by the block 90 (FIG. 3). That is, periodically according to schedule, the central computer HC may actuate the front end concentrator TI to dial up the terminal T1 through the telephone facility TF. Accordingly, the modem 48 is activated and the FIFO 44 is unloaded to the central computer HC as a backup. However, if the contents of the FIFO 44 exceeds a predetermined threshold, the modem 48 is actuated by the terminal 16 to dial up the central computer HC through the telephone facility TF and the concentrator TI. The alternative steps are illustrated in FIG. 3 by the block 94. Accordingly, unloading operations may occur on a definite schedule, in relation to the processing of lottery tickets or when the volume of data commands an unloading operation from the FIFO 44 to the host central computer as represented by the block 96. Further details of transfers and verifications between the terminals T1–Tn and the central computer HC are provided below.

In the normal operation of a lottery, it is contemplated that a substantial volume of lottery tickets TR will be sold and dispensed as described above. Thereafter, on a scheduled date, a drawing or other reliable procedure will select a winning-number sequence or sequences. The holders of lottery tickets TR evidencing winners may then present the winning tickets for redemption. Normally, during the redemption or verification mode the terminal T1 will be attended by a person other than the ticket holder. Accordingly, the operator actuates the keyboard 24 to set the system in a "redeem" mode as indicated by the query block 58 (FIG. 3).

With the system in the "redeem" mode, winning tickets are verified by the processor 32 functioning in cooperation with the terminal computer 16. This mode of operation is particularly vulnerable as a basis for fraud or other misuse. For example, in the disclosed embodiment, the verification includes: determining the ticket to be authentic (not counterfeit), verifying the lottery number, verifying the date of sale, and verifying the dispensing terminal. To verify the authenticity of the ticket TR, the processor 32 senses the uniqueness characteristic of the ticket for comparison with a recorded uniqueness characteristic. The operation or process step is illustrated in FIG. 3 by the query block 90 (upper right).

Additionally, the ticket is sensed, as by optical readers in the processor 32, to verify other data as illustrated by the query block 92. If either of the tests fail, the ticket is rejected as indicated by the block 94. Alternatively, passing the tests prompts an indication of approval as indicated by the block 96. Data for any test may require data exchange and confirmation from the central computer HC.

Generally, both payoffs and rejections will involve human intervention and supervision. Of course, various payoff policies may be implemented in the interests of effective administration. In that regard, the system of the present invention incorporates security techniques for safeguarding communication relationships between the terminals T1–Tn and the central apparatus CA.

Figure 4:
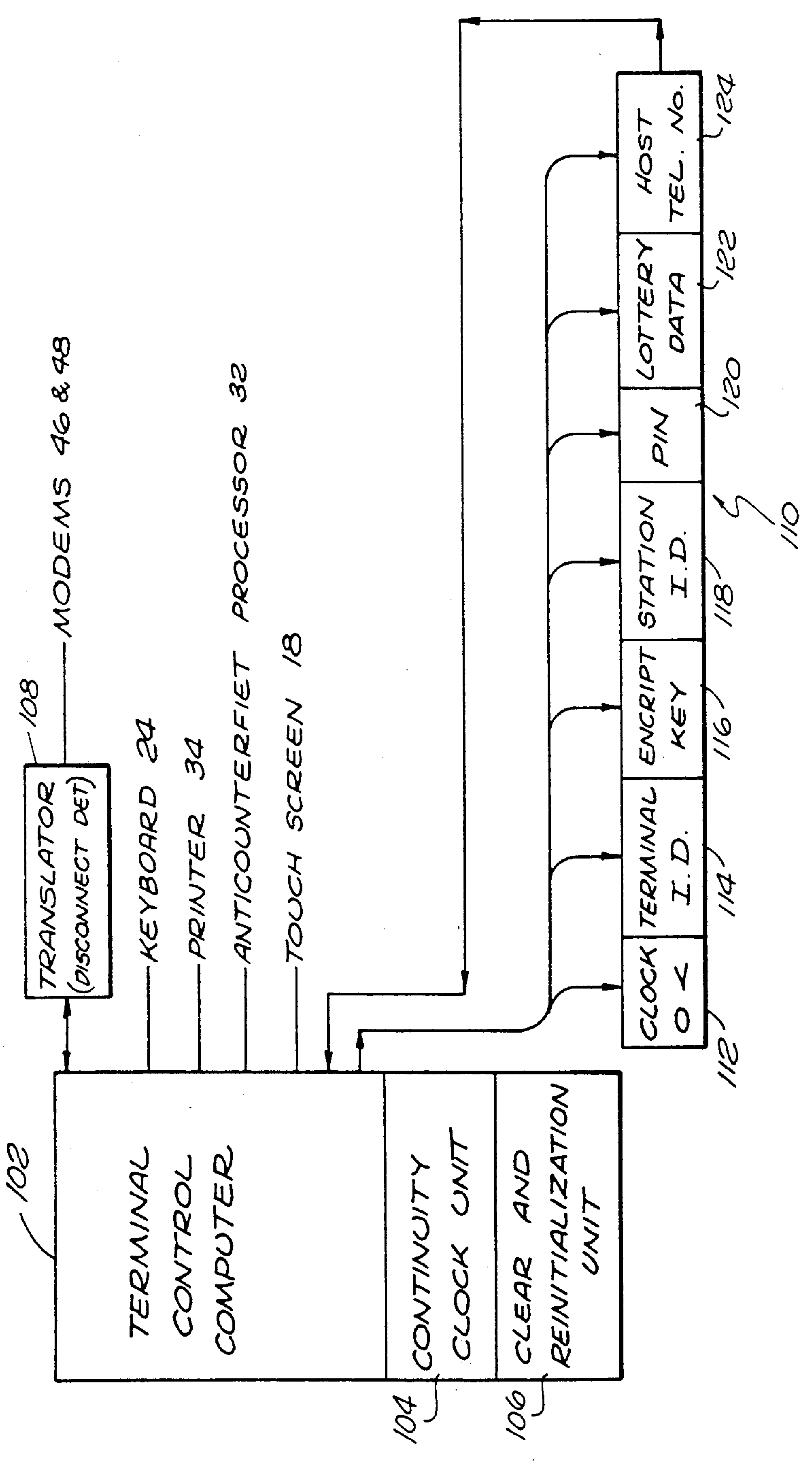
FIG. 4 is a block diagram of the terminal computer as shown in FIG. 1.

As indicated above, in various embodiments, central computer communications may occur at various stages of lottery operation, for example in the redeem mode as explained above. Accordingly, the lottery data exchanged between one of the terminals T1–Tn and the central apparatus may vary considerably. However, in accordance herewith, security data and control signals are also communicated as to indicate any operating anomaly prompting corrective action as will now be treated below. In that regard, consider now FIG. 4 showing the terminal computer 16 (FIG. 1) in some detail for further explanation and understanding. Specifically, a terminal control computer 102 is shown in close operative relationship with a continuity clock unit 104 and a reinitialization unit 106.

The terminal control computer 102 is connected through a translator 108 to the modems 46 and 48 (FIG. 1). Similarly, lines from the terminal control computer 102 are provided for connection to other elements as illustrated in FIG. 1, specifically the keyboard 24, the printer 34, the anti-counterfeit processor 32 and the touch screen 18.

The terminal control computer 102 also is connected to a data packet register 110. As illustrated, the register 110 accommodates seven distinct data fields, specifically: a "Clock OK" field 112, a "Terminal ID" field 114, an "Encryption Key" field 116, a "Station ID" field 118, a "PIN" field 120, a "Lottery Data" field 122 and a "Host Telephone Number" field 124.

Basically, the terminal control computer 102 formulates communication data packets in the register 110 for transmission through the translator 108, ultimately to the central apparatus CA (FIG. 1). Essentially, the translator 108 performs a protocol change and is housed separately from the other elements as shown in FIG. 4. For example, the translator 108 may be permanently mounted in an inconspicuous location, e.g. under a counter, above a false ceiling, or behind a partition wall. The translator 108 is the terminus for the dial-up line and as indicated is connected to the modems 46 and 48 (FIG. 1).

As indicated above, the translator 108 is an intelligent device that changes the protocol of messages between the terminal and the central apparatus CA. Consequently, the terminal cannot communicate with the central apparatus CA unless the signals pass through the translator 108. Consequently, a stolen terminal cannot access the central apparatus CA in the absence of a form of the translator 108.

The occurrence of a disconnected terminal also is sensed as a possible indication that a terminal has been improperly removed from its designated site. Specifically, the translator 108 incorporates a latch to indicate disconnection of the terminal control computer. Additionally, the continuity clock unit 104 takes the form of a clock that sets a latch in the event of a power loss. More specifically, the continuity clock unit 104 incorporates a timer (battery backup) to set a latch after a predetermined period of power loss. Consequently, as explained in detail below, if the terminal control computer 102 is disconnected from power or from the translator 108, a negative "Clock OK" signal will be formed on the occasion of the next data transmission to the central apparatus CA. Accordingly, the central computer HC is alerted to the possibility of misuse and may institute corrective action. For example, the terminal may be instructed to dial up the central computer HC with the consequence of providing caller identification signals (ANI) to confirm location of the terminal at the proper location identified by a calling number.

An indication that the terminal control computer 102 (FIG. 4) has been disconnected is one of the anomalies which prompt action by the system to verify or authenticate the propriety of the terminal operation. Other anomalies involve the format and time of communication as well as identification improprieties.

Upon the detection of an anomaly, in addition to verifying the calling location, the system may variously isolate the calling station or disqualify the calling station as by clearing various operating data. Identifications may then be tested.

Considering the communication operation of the terminal as related to FIG. 4, depending on the situation, lottery data is formulated in the terminal control computer 102. As indicated above, for example, the data may be directed to verifying a winner. Such data is set in the "lottery data" field 122. Other data is either formulated for the inquiry or is drawn from memory in the control computer 102. Specifically, four of the fields in the register 110 are loaded from memory in the computer 102, i.e., the "Terminal ID" field 114, the "Encryption Key" field 116, the "Station ID" field 118 and the "Host Telephone Number" field 124.

The personal identification of the operator is entered through the keyboard 24 (FIG. 1) and set into the "PIN" field 120. The lottery data also involves input devices, as the anticounterfeit processor 32 and the keyboard 24. Such data is set in the "Lottery Data" field 122.

Finally, the "Clock OK" field 112 is set (a "1" digit is entered) if the terminal has been disconnected as indicated above and sensed by the continuity check unit 104. Accordingly, the loading of the register 110 is completed.

Recapitulating to some extent, the register 110 is set to accomplish secure communication with the host computer HC.

Specifically, if there has been a loss of power to the terminal control computer 102 for a time greater than a predetermined period, a signal is provided from the computer 102 to indicate that fact in the "Clock OK"

field 112. Specifically, the field 112 comprises a single binary bit, being a "0" in the event of normal operation and being a "1" in the event of a power failure in excess of a predetermined time period. Essentially, the continuity clock unit 104 provides a signal representative of "1" to the field 112 in the event of a power loss in excess of a predetermined interval.

As mentioned, the field 114 receives the stored terminal identification and the field 116 receives the current encryption key. In that regard, master encryption keys are established and maintained in a key's data base of the central computer HC (FIG. 1). When keys are transmitted, they are encrypted as working keys that are changed with every transaction from the terminal. The changed keys are generated randomly in the central computer HC and are stored in a random access memory. In the event of a power failure in the terminal control computer 102 (FIG. 4) the keys are lost as a further security aspect in relation to disconnected terminals.

The register field 122 receives lottery data from the terminal computer 102 which may take various forms depending upon the operating format. For example, the lottery data may comprise data on a ticket presented as a winner. Alternatively, test data or inquiry data may also be provided from the terminal computer 102.

Generally, the time of transmission from a terminal and the format of the transmission are monitored by the central computer HC for anomalies which may initiate a need for authentication or a verification of the current terminal. As indicated above, and explained in greater detail below, another security aspect involves the reinitialization unit 106 of the terminal control computer 102 to clear operating software from the computer 102 and reestablish such software subsequent to authentication or verification.

Also at the time of transmission, the translator 108 may load a "1" digit in the "Clock OK" field 112. If the translator 108 has detected a disconnection of the terminal control computer 102, a latch is set and the digit is inserted serially during transmission to the central computer CA.

Figure 5:
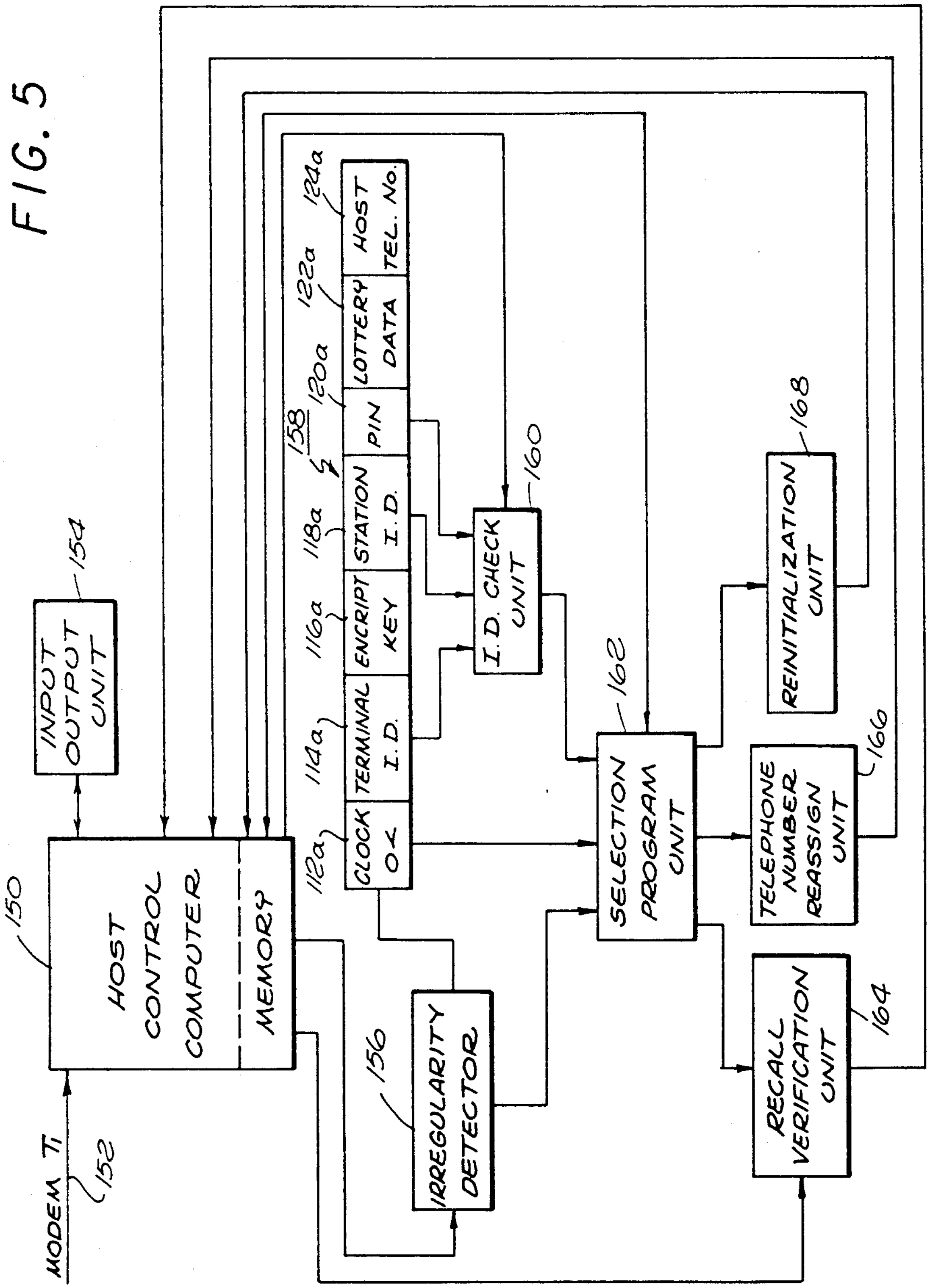
FIG. 5 is a block diagram of the central host computer as shown in FIG. 1.

Reference will be made to FIG. 5 showing some separated detail of the central computer HC. That is, some units are shown separately for purposes of explanation. Specifically, a host control computer 150 (FIG. 5, upper left) is connected to the front-end concentrator TI (FIG. 1) as indicated by a line 152. An input-output unit 154 for the computer 150 is separately illustrated.

Data packets from the remote terminals T1–Tn pass from the host control computer 150 through an irregularity detector 156 to an operating register 158. The operating register 158 includes data fields identical to those pictured and discussed for the register 110 (FIG. 4). Accordingly, the fields of the operating register 158 are designated similarly to the fields of the register 110, however, in each case with the addition of the letter "a". For example, the "Clock OK" field is designated 112*a*.

Identification fields of the register 158 are coupled to an identification check unit 160. Specifically, the fields 114*a*, 118*a* and 120*a* are connected to the identification check unit 160. Functionally, stored reference identification data from the host control computer 150 is supplied to the identification check unit 160 for comparison with the similar format data carried in the register 158. If the test does not produce a coincidence, an identification anomaly signal is supplied from the unit 160 to a corrective-action selection program unit 162.

Anomaly signals are also received by the program selection unit 162 from the irregularity detector 156 and the "Clock OK" field 112*a* of the register 158. Specifically, an irregularity anomaly signal is provided from the irregularity detector 156 in the event that an inquiry involves an excess amount of time or does not match the standard operating format. Accordingly, the irregularity detector 156 simply comprises a signal format comparator and a clock for indicating the interval consumed by the transmission of a data packet. Of course, a departure either from the standard format or the standard transmission interval will result in the production of an irregularity signal from the detector 156.

Irregularity signals supplied to the selection program unit 162 prompt various verification or authorization action. In that regard, the unit 162 may selectively actuate any of: a verification recall unit 164, a telephone number reassignment unit 166 or a reinitialization unit 168. Prior to considering the operations of such units, some exemplary misuses will be considered along with the corrective action in accordance with the present invention.

As indicated above, one potential indication of misuse is the loss of terminal power for a meaningful interval. That is, regardless of terminal security, there remains a possibility of theft and fraudulent use. Typically, the terminal would be removed to another location for fraudulent misuse as in an effort to present improper lottery data as to confirm or command a fraudulent payment.

In the disclosed embodiment, the translator 108 (FIG. 4) is a requisite element for communication between the terminal control computer 102 and the central computer HC (FIG. 1). Accordingly, a measure of security is provided against the misuse of a stolen terminal control computer with the operating elements as illustrated in FIG. 4 excluding the translator 108. However, a possibility exists that the translator 108 may be disconnected or stolen. Accordingly, the system involves further security based on a discontinuity of connection as indicated above.

As indicated above, if the terminal computer 102 loses power or if the translator 108 senses a disconnection, the anomaly is manifest by the "Clock OK" signal as received in the field 112*a* of the register 120. One responsive action to a "1" bit in the field 112*a* involves the recall verification unit 164 cueing the terminal to place a fresh call. On the occurrence of such a fresh call, the host control computer 150 receives calling number signals (ANI) indicating the telephone number of the telephone station from which the displaced terminal is being operated. That number is then tested against the stored reference number for the operation of the terminal in a test provided by the recall verification unit 164 (FIG. 5).

If the present calling number and the reference number do not coincide, inappropriate use of the terminal is indicated. As a consequence, personal attention may be commanded by the input-output unit 154 or other action may be taken as by the units 166 or 168.

Another danger of misuse involves the possibility of a so-called computer "hacker" simulating the operations for one of the terminals T1–Tn. Typically, such an event would involve accumulating the knowledge of repeated failures to formulate the critical format. In the disclosed system, the success of a "hacker" to penetrate the system with a less-than-perfect data or time format would actuate the irregularity detector 156 to provide an anomaly signal to the selection program unit 162. Of course, the telephone calling number may be tested as explained above or alternatively telephone numbers may be reassigned by the unit 166. For example, the hacker may be instructed to call on a different number thereby isolating the calling terminal for special consideration as with manual intervention. As another alternative, the reassign unit 166 may instruct all terminals in a group, e.g. group GRI (using the calling number involved) to employ a fresh calling number. As a consequence, the hacker is the exclusive user of the original number and is isolated for observation.

As another action, in the event of any observed anomaly, e.g. power loss of terminal, irregularity of time or format, failure of identification confirmation, the selection program unit 162 may actuate the reinitialization unit 168. The action may be taken in conjunction with either or both of the units 164 and 166. Essentially, the reinitialization unit 168 disables a calling terminal as by clearing the stored identification and encryption data. For example, in one operating format, with the occurrence of an anomaly, the calling terminal is disabled by a "clear" signal provided from the reinitialization unit 168 through the host control computer 150. The operation may be followed by a request for recall and actuation of the recall verification unit 164 to test the location of the terminal utilizing automatic number identification signals (ANI). Note that in the event of such a recall, the host control computer 150 monitors incoming calls for a similar data packet to the data packet received from the instructed terminal. If the terminal is verified or authenticated, the reinitialization unit 168 may transmit operating identification and encryption data to the terminal to restore routine operation.

In view of the above functional and structural description, the operation of the system (FIGS. 1, 4 and 5) with respect to security aspects will now be considered for an exemplary communication. Specifically, assume the terminal T1 (FIG. 1) is involved and that its control computer 102 (FIG. 4) has lottery data that is to be communicated to the host control computer 150 (FIG. 5). As indicated above, the lottery data to be communicated may take various forms; however, in relation to the system of the disclosed embodiment, the data might well serve to verify a winner and approve or initiate a payment.

Preliminary to a data transmission from the terminal T1, a data packet is formulated in the register 110 (FIG. 4). As explained above, if the terminal T1 has been without electrical power for a period greater than a predetermined interval, the "Clock OK" field 112 receives a "1" bit. Identification data, either stored within the terminal control computer 102 or developed from a manual interface is set into the fields 114, 116, 118 and 120. The lottery data formulating the inquiry or instruction is provided in the field 122, and finally, the calling number for the central apparatus CA is set in the field 124.

With the completion of the data packet, telephonic communication is established. That is, the "Host Telephone Number" field 124 actuates an automatic dialer in the modem 16. Next, the terminal control computer 102 (FIG. 4) transmits the data fields in sequence through the translator 108. In the course of such transmission, the translator 108 performs two functions. First, as explained above, the translator 108 accomplishes a protocol change in the data to afford further security. Second, the translator reveals its connection history with the data control computer 102. If the units have been disconnected, a latch is set in the translator 108 and during transmission, the "Clock OK" field receives a "1" bit.

The data packet passes through the telephone facility TF (FIG. 1) and is received in the central computer HC. Specifically, the data is received by the host control computer 150 (FIG. 5) and is passed through the irregularity detector 156 to the operating register 158.

As explained above, anomalies in the transmission time or format are detected with the placement of data in the register 158. Anomalies of identification are sensed by the ID check unit 160. Additionally, the field **112*a* of the register 158** indicates an anomaly in the use of the terminal from which the inquiry originated, as related to loss of power.

As explained above, the anomaly signals are provided to a selection program unit 162 that may be variously set to accomplish different steps for verification, authentication, telephone number reassignment or terminal disabling. As explained above, the recall verification unit prompts the remote terminal to place a fresh call with the result that automatic number identification signals (ANI) are provided for a comparative test by the unit 164 with stored reference signals.

Telephone number reassignment operations are accomplished by the reassign unit 166 and may involve instructing a calling terminal to place a fresh call using a distinct telephone number. Of course, such operation might also involve the use of automatic number identification signals to perform a verification. However, the reassignment accomplishes isolation.

Various anomalies may be programmed by the unit 102 to activate the reinitialization unit 168. In that event, the remote terminal is essentially disabled by the removal of identification and encryption data. The operation of the terminal will be restored only after verification, at which time the unit 168 will provide the requisite operating information.

In accordance with the system of the disclosed embodiment, operation involves relatively secure data, substantially reliable lottery implementation and effective verification. Of course, the system of the present invention may be embodied in a wide variety of forms utilizing many different specific techniques and structures. While certain exemplary operations have been stated herein, and certain detailed structures have been disclosed, the appropriate scope hereof is deemed to be in accordance with the claims as set forth below.

What is claimed is:

1. A lottery system for operation with telephonic communication facilities, including a plurality of terminal units to formulate lottery data packets for communication to said lottery system in a format with identification, said lottery system comprising:

- receiving means for receiving said lottery data packets;
- memory means for storing reference terminal data for said terminal units;
- means coupled to said memory means for testing said lottery data packets received by said receiving means to provide anomaly signals indicating irregularities with regard to said data packets; and
- means controlled by said anomaly signals for providing control instructions to said terminals, said means controlled by said anomaly signals further comprising means for defining corrective action prompted by said anomaly signals.

2. A system according to claim 1 wherein said means for testing comprises means to test reference signals from said memory means against signals from said terminals.

3. A system according to claim 2 wherein said means for testing includes means to test reference signals against signals in a data packet.

4. A system according to claim 2 wherein said means for testing includes means to test reference signals against automatic number identification signals (ANI) provided by said telephonic communication facilities.

5. A system according to claim 1 wherein said means for testing includes means for detecting irregularities in the format of said data packets.

6. A system according to claim 1 wherein said means for testing includes means for detecting irregularities in the transmission time of said data packets.

7. A system according to claim 1 wherein said means for testing includes means to test said data packet for the presence of a signal indicating power loss at a terminal.

8. A system according to claim 1 wherein said means controlled by said anomaly signals includes means for instructing a terminal to place a fresh call.

9. A system according to claim 8 wherein said means for instructing indicates a fresh call number.

10. A system according to claim 1 wherein said means controlled by said anomaly signals includes means for disabling a terminal by instructing the clearance of operating data.

11. A lottery system according to claim 1 further including control means to transfer lottery data from one terminal unit to another terminal unit.

12. A lottery terminal unit for operation with telephonic communication facilities and a host computer, said terminal comprising:

a continuity clock means for sensing a loss of power in said terminal unit to provide a discontinuity signal indicating power loss or the absence of power loss;

means for forming a lottery data packet including lottery data and said discontinuity signal; and means for coupling said lottery data packet for transmission to said host computer by said telephonic communication facilities.

13. A lottery terminal unit according to claim 12 wherein said means for coupling includes modem means for dial-up connection to said telephonic communication facilities.

14. A lottery terminal unit according to claim 12 wherein said terminal unit further includes consideration approval means for selectively accepting valid payment for lottery participation.

15. A lottery terminal unit according to claim 12 wherein said terminal unit further includes document means for issuing ticket documents to evidence lottery participation.

16. A lottery processing system for operation with telephonic communication facilities comprising:

a host computer including:

(a) receiving means for receiving said lottery data packets;

(b) memory means for storing reference terminal data for said terminal units;

(c) means coupled to said memory means for testing said lottery data packets received by said receiving means to provide anomaly signals indicating irregularities with regard to said data packets; and (d) means controlled by said anomaly signals for providing control instructions to said terminals, said means controlled by said anomaly signals further comprising means for defining corrective action prompted by said anomaly signals; and a plurality of terminal units including means to formulate lottery data packets including lottery data and terminal unit identification data.

* * * * *

UNITED STATES PATENT AND TRADEMARK OFFICE

CERTIFICATE OF CORRECTION

PATENT NO. : 5,119,295

DATED : June 2, 1992

INVENTOR(S) : SHASHI B. KAPUR

It is certified that error appears in the above-identified patent and that said Letters Patent is hereby corrected as shown below:

On the title page, Item [54] and Column 1, line 1,

After "MONITORING" CHANGE "OR" to "OF".

Column 3, line 1, after "Similarly," delete "lo".

Signed and Sealed this

Fourteenth Day of September, 1993

Attest:

BRUCE LEHMAN

*Attesting Officer* *Commissioner of Patents and Trademarks*